United States Patent [19]

Okamoto

[11] Patent Number: 5,298,035
[45] Date of Patent: Mar. 29, 1994

[54] PROCESS FOR PREPARING THERMOSENSITIVE FIBROUS STRUCTURE

[75] Inventor: Masao Okamoto, Osaka, Japan

[73] Assignees: OG Kabushiki Kaisha, Osaka; Dainichiseika Color & Chemicals Mfg. Co., Ltd., Tokyo, both of Japan

[21] Appl. No.: 994,873

[22] Filed: Dec. 24, 1992

[30] Foreign Application Priority Data

Dec. 27, 1991 [JP] Japan .................. 3-347430

[51] Int. Cl.$^5$ .................. C09B 67/00; C09B 67/18; D06M 13/322; D06P 5/06
[52] U.S. Cl. .................................. 8/554; 8/181; 8/490; 8/550; 8/906; 8/918
[58] Field of Search ............ 8/554, 550, 556, 490, 8/606, 918, 181, 906

[56] References Cited

U.S. PATENT DOCUMENTS

| | | | |
|---|---|---|---|
| 4,028,118 | 6/1977 | Nakasuji | 106/21 |
| 4,118,538 | 10/1978 | Balland | 428/425 |
| 5,221,288 | 6/1993 | Kamata et al. | 8/554 |

FOREIGN PATENT DOCUMENTS

| | | |
|---|---|---|
| 0480162 | 4/1992 | European Pat. Off. |
| 1-280080 | 11/1989 | Japan . |
| 3-174073 | 7/1991 | Japan . |
| 3-193979 | 8/1991 | Japan . |

*Primary Examiner*—Paul Lieberman
*Assistant Examiner*—Caroline L. Dusheck
*Attorney, Agent, or Firm*—Armstrong, Westerman, Hattori, McLeland & Naughton

[57] ABSTRACT

A process for preparing a thermosensitive fibrous structure which includes adding a fibrous substrate mainly composed of cellulosic fiber, microcapsules including a thermochromic material, a cationic surfactant and a nonionic surfactant to a dye bath maintained at a temperature of not higher than 90° C. and then adding an agent for imparting exhaustion property in the bath at a pH not more than 7, thereby causing the fibrous substrate to exhaust the microcapsules from the bath. According to this process, there can be obtained a thermosensitive fibrous structure wherein microcapsules are almost completely exhausted and uniformly provided.

4 Claims, No Drawings

PROCESS FOR PREPARING THERMOSENSITIVE FIBROUS STRUCTURE

BACKGROUND OF THE INVENTION

The present invention relates to a process for preparing a thermosensitive fibrous structure, and more particularly to a process for preparing a thermosensitive fibrous structure which causes a fibrous substrate mainly composed of cellulosic fiber to exhaust microcapsules including a thermochromic material uniformly and almost completely from a bath, and if necessary, can improve color fastness to washing of the thermosensitivity.

Hitherto, there are proposed many processes for providing a fibrous structure with microcapsules including various functional materials. For example, in Japanese Unexamined Patent Publication No. 193979/1991, there is disclosed a method which comprises anionizing a keratin fiber by treating with an oxdizing agent and thereby causing the fiber to exhaust and to adsorb microcapsules including perfume cationized by polyamide epichlorohydrin. However, the method cannot be applied to a cellulosic fiber which does not have either a disulfide linkage or a peptide linkage. In Japanese Unexamined Patent Publication No. 174073/1991, there is described a method wherein a polyamide, a polyamine derivative or a lactam derivative which has polyoxyalkylene units without ionicity, and tannic acid and tartar emetic, a sulfonic acid compound or the like which is usually used as a fixing agent for a dye for a polyamide fiber are used to accelerate fixing of capsules to fibers when a polyamide fiber is uniformly provided with microcapsules including perfume. However, even if these fixing agents are applied to a cellulosic fiber, the microcapsules cannot be fixed uniformly. In a method of Japanese Unexamined Patent Publication No. 280080/1989, after water repellent treating with a cationic softening agent and silicone softening agent, a cotton plain weave fabric is padded with organosiloxane prepolymer and microcapsules including perfume, and then dried at 120° C. for 2 minutes. However, even if this method is employed, the above mentioned capsules cannot be provided uniformly. Further, an object of these technique is to cause a fiber to shed fragrance by breaking microcapsules, for example, when the fiber is touched. Therefore, it is enough that the capsules fix uniformly when estimating with respect to a somewhat large area.

On the other hand, in case of providing a fibrous structure with microcapsules including a thermochromic material, considerably high uniformity is required. Therefore an object of this case cannot be achieved by the prior art as mentioned above.

An object of the present invention is to solve the above mentioned problem when a cellulosic fibrous substrate is provided with microcapsules including a thermochromic material.

This and the other objects of the present invention will become apparent from the description hereinafter.

SUMMARY OF THE INVENTION

In accordance with the present invention, there is provided a process for preparing a thermosensitive fibrous structure which comprises: adding a fibrous substrate mainly composed of cellulosic fiber, microcapsules including a thermochromic material, a cationic surfactant and a nonionic surfactant to a dye bath maintained at a temperature of not higher than 90° C. and then adding an agent for imparting exhaustion property in the bath at a pH not more than 7, thereby causing the fibrous substrate to exhaust the microcapsules from the bath.

According to the process of the present invention, there can be obtained a thermosensitive fibrous structure wherein microcapsules are almost completely exhausted and uniformly provided. In addition, by carrying out an after-treatment, the thermosensitivity of the obtained fibrous structure can be improved in color fastness to washing.

DETAILED DESCRIPTION

As the cellulosic fiber used in the present invention, there are, for example, natural cellulosic fibers such as cotton and hemp, regenerated fibers such as viscose rayon and cuprammonium rayon, semisynthetic fibers such as diacetate rayon and triacetate rayon, and the like. One or more kinds of the above mentioned fibers can be used.

The above mentioned fibrous substrate mainly composed of cellulosic fiber means a fibrous substrate containing at least 20% (by weight, hereinafter the same), preferably at least 50% of the above mentioned cellulosic fiber. As a fiber which can be contained other than the cellulosic fiber, there are, for example, synthetic fibers such as polyester fiber, polyamide fiber, polyurethane fiber, polyacrylonitrile fiber, polyvinyl chloride fiber, polyethylene fiber and polypropylene fiber, animal fibers such as silk and sheep wool and the like. The fiber other than the cellulosic fiber is, however, not be limited to these fibers. There can be also used one or more kinds of the fiber which can be contained other than the cellulosic fiber.

There is no limitation in processes for preparing fibrous substrates using both the cellulosic fibers and the other fibers. There can be chosen various kinds of process such as cotton mixing, mix weaving, mix knitting and mix paper making.

As the above mentioned fibrous substrate, there are, for example, a yarn, a knit, a woven fabric, a nonwoven fabric, a paper, a fibrous substrate prepared in a form of final product or the like which is prepared according to a known method from the above mentioned materials such as the cellulosic fiber as a main component and the other fiber which materials are, e.g., in a fluffy state. The fibrous substrate is, however, not limited to these substrates.

The microcapsules including a thermochromic material used in the present invention are those having the diameter of from about 0.1 to about 50 μm, preferably from about 1 to about 10 μm which include a known thermochromic material such as trade name DAI-THERMO supplied by DAINICHISEIKA, trade name METAMOCOLOUR by PILOT INK CO LTD, trade name CHROMICCOLOUR by MATSUI SHIKISO CHEMICAL CO., LTD., and so on. As concrete examples, there are microcapsules containing at least three compounds as essential components, namely, an electron donative coloring organic compound, a compound having phenolic hydroxyl group and a compound selected from the group consisting of an alcohol, an ester, a ketone and an ether as described in Japanese Examined Patent Publication No. 44708/1976, and the like. The microcapsules are, however, not limited to these.

The above mentioned microcapsules can be prepared according to known processes. For example, microcapsules can be prepared by a process wherein a non-aqueous solution containing a compound which forms a shell by polycondensation is finely dispersed in an aqueous dispersion containing one or more of sodium alginate, hydroxyethylcellulose and carboxymethylcellulose, as described in Japanese Examined Patent Publication No. 33795/1973; a process wherein there are mixed an aqueous solution of at least one of water-soluble inorganic compound selected from a silicate of alkaline metal, a halide of alkaline earth metal and a nitrate of alkaline earth metal, and an organic solvent whose water-solubility is at most 5% to give a w/o type emulsion, and then there are mixed the above mentioned emulsion and an aqueous solution of a water-soluble inorganic compound which produce a water-insoluble precipitate by the reaction with the above mentioned inorganic compound in the emulsion; and the like. According to these processes, microcapsules made of various materials can be prepared. Microcapsules including a thermochromic material can be prepared by using the above mentioned thermochromic material in the above mentioned processes. However, the above mentioned microcapsules usable in the present invention are not limited to those obtained by these methods. As the above mentioned microcapsules, those which cannot be destroyed for a long period after the exhaustion can be prepared by selecting a kind of material as shell, the thickness of the shell or the like.

In the present invention, a thermosensitive fibrous structure can be prepared by adding a fibrous substrate mainly composed of cellulosic fiber, microcapsules including a thermochromic material, a cationic surfactant and a nonionic surfactant to a dye bath maintained at a temperature of not higher than 90° C. and then adding an agent for imparting exhaustion property in the bath at a pH not more than 7, thereby causing the fibrous substance to exhaust the microcapsules from the bath.

On the exhaustion, the temperature of the bath is limited to at most 90° C., preferably from 50° to because there are disadvantages at a temperature of more than 90° C., for example, that the fixing of microcapsules to a fibrous substrate is inhibited, and the like.

In order to achieve the main object of the present invention, namely to fix microcapsules uniformly to a fibrous substrate, and in order to give some exhaustion property to the fibrous substrate and flocculation preventing property to microcapsules and an agent for imparting exhaustion property, pH is limited to not more than 7. A cationic surfactant is added for the fixing of microcapsules to the fibrous substrate and a nonionic surfactant is added for the prevention of flocculation between microcapsules and an agent for imparting exhaustion property. Furthermore, the agent for imparting exhaustion property is added for the almost complete exhaustion of microcapsules to the fibrous substrate.

There is no particular limitation in the order for adding each material except for an agent for imparting exhaustion property to the above mentioned bath. After each material except for the agent for imparting exhaustion property is successively added and homogenized in the bath, the agent for imparting exhaustion property can be added in the presence of a fibrous substrate. Alternatively, after the materials except for the agent for imparting exhaustion property are previously mixed and added to the bath followed by homogenizing, the agent for imparting exhaustion property can be added to the bath in the presence of the fibrous substrate. However, it is preferable, from the viewpoint of uniform fixing of microcapsules to the fibrous substrate and almost complete exhaustion, that after a surfactant fixes enough to the fibrous substrate, thereto are added microcapsules and an acid followed by adjusting pH to not more than 7 and then thereto is added the agent for imparting exhaustion property.

The amount of each material to be used in the above mentioned bath is as follows.

Microcapsules are used preferably in an amount of from 0.4 to 12% o.w.f. When the amount is less than 0.4% o.w.f., coloring and fading property is not clear and when more than 12% o.w.f., microcapsules easily fall.

A cationic surfactant and a nonionic surfactant are used preferably in a total amount of from 0.3 to 10% o.w.f. When the amount is less than 0.3% o.w.f., the fixing of microcapsules to a fibrous substrate cannot be accelerated or the flocculation between microcapsules and an agent for imparting exhaustion property cannot be prevented. When more than 10% o.w.f., the effect of accelerating the fixing does not increase in spite of the increase of the used amount. The nonionic surfactant is used in an amount of from 1 to 200 parts (by weight, hereinafter the same), preferably from 20 to 60 parts per 100 parts of the cationic surfactant. When the amount of the nonionic surfactant is less than 1 part, the flocculation between microcapsules and the agent for imparting exhaustion property cannot be prevented, and when more than 200 parts, the effect does not increase in spite of the increase of the used amount.

An acid can be used in an amount which can adjust the pH of the bath to 7, preferably from 2 to 6.

An agent for imparting exhaustion property can be used preferably in an amount of from 0.4 to 8% o.w.f.

As concrete examples for the above mentioned acid, there are, for example, organic acids such as an aliphatic monocarboxylic acid e.g. formic acid, acetic acid or propionic acid, and aliphatic dicarboxylic acid e.g. oxalic acid, malonic acid or succinic acid and an aromatic carboxylic acid e.g. benzoic acid, phthalic acid or terephthalic acid, and inorganic acids such as hydrochloric acid, sulfuric acid, nitric acid and phosphoric acid, and the like. The acid is, however, not limited to these. One or more of these acids can be used.

As the above mentioned cationic surfactant, a known surfactant can be used. As concrete examples, there are, for example, a salt of an aliphatic amine such as a monoalkylamine, a dialkylamine or a trialkylamine or an ethyleneoxide addition thereof and an organic or inorganic acid; a salt of an aliphatic quaternary ammonium such as a tetraalkylammonium halide; a salt of aromatic quaternary ammonium such as a salt of alkyldimethylbenzylammonium, benzetonium chloride or an alkylpyridinium halide; imidazolynium halide and the like. The cationic surfactant is, however, not limited to these.

As the above mentioned nonionic surfactant, a known surfactant can be used. As concrete examples, there are, for example, a polyoxyethylene alkyl ether, a polyoxyethylene alkylaryl ether, a polyoxyethylene polyoxypropylene ether, a polyoxyethyleneglycerin fatty acid ester, a polyoxyethylenesorbitan fatty acid ester, a polyoxyethylene fatty acid ester, a fatty acid alkanol amide, a polyoxyethylenealkylamine and the like. The nonionic surfactant is, however, not limited to these.

As the above mentioned agent for imparting exhaustion property, a known agent can be used. For example, there are so-called amino-modified silicone and amino-modified polyorganosiloxane e.g. having the formula (I):

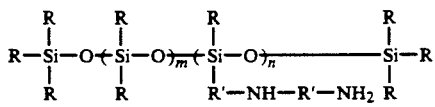

or the formula (II):

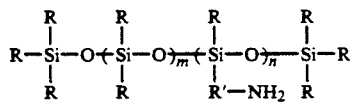

wherein R is a group selected from the group consisting of an alkyl group such as methyl, ethyl or propyl, an alkoxy group such as methoxy, ethoxy or propoxy and an aromatic group such as phenyl, naphthyl or benzyl, and plural R may be the same or different from each other; R' is a group selected from the group consisting of an alkylene group such as methylene, ethylene or propylene and an aromatic group such as phenylene, naphthylene or tolylene, and plural R' may be the same or different from each other. The agent is, however, not limited to these. There can be suitably used a cationic compound which can be obtained by adding an acid to imino or amino group in the compound having the above mentioned formula or by converting the imino or amino group into quaternary ammonium group.

The bath ratio is generally from 1:50 to 1:100 in carrying out the present invention, and water (temperature: from about 10° to about 30° C.) is used to give such bath ratio. Though the treating time for the exhaustion is not particularly limited, the treatment can be fully done for from about 5 to about 30 minutes after the addition of each treating agent.

According to the process for preparing a thermosensitive fibrous structure of the present invention, microcapsules do not remain in the bath because of the almost complete exhaustion of microcapsules from the bath and microcapsules are not consumed wastefully. Furthermore the waste liquid can be easily disposed and since microcapsules high-uniformly fix to a fibrous substrate, the coloring state is the same degree as that in case of dyeing a usual fiber with a usual dye. There causes a clear color change or fading when a thermosensitive structure of the present invention is partly heated. Thus a fibrous structure having excellent thermosensitivity can be prepared.

Thus obtained thermosensitive fibrous structure shows the thermosensitivity for a long period.

In order to improve properties such as color fastness to washing of the above-mentioned thermosensitive fibrous structure, an urethane resin or a derivative thereof can be further applied to a fibrous structure in the same bath or another bath after the exhaustion of microcapsules to the fibrous substrate.

When an urethane resin or a derivative thereof is to be applied, a dispersion or the like of the urethane resin or a derivative thereof is added to the bath to give a concentration of preferably from 0.4 to 20 g/l and then the thermosensitive fibrous structure is treated therein.

As the dispersion of an urethane resin or a derivative thereof used for the above mentioned object, a known dispersion can be used. As concrete examples, there are, for example, dispersions of an urethane resin or a derivative thereof obtained by the reaction of a polyol such as ethyleneglycol, propyleneglycol, butyleneglycol, hexanetriol or trimethylolpropane or a polyester polyol of the above mentioned polyol and a polybasic acid such as glutaric acid, adipic acid, sebacic acid, phthalic acid, isophthalic acid or terephthalic acid, and a polyisocyanate such as tetramethylenediisocyanate, hexamethylenediisocyanate, tolylenediisocyanate, 4,4-diphenylmethanediisocyanate, diphenylmethanediisocyanate, triphenylmethanetriisocyanate or isophoronediisocyanate, and the like dispersed in water. The dispersion is, however, not limited to these.

In order to improve color fastness to light of the above-mentioned thermosensitive fibrous structure, a known ultraviolet absorbent can be applied to the fibrous structure in the same bath as above mentioned or in another bath. The ultraviolet absorbent is provided to the fibrous structure so that the concentration thereof is preferably from 0.025 to 5% o.w.f.

The present invention is more specifically described and explained by means of the following Examples and Comparative Examples. It is to be understood that the present invention is not limited to the Examples, and various changes and modifications may be made in the invention without departing from the spirit and scope thereof.

EXAMPLE 1

To a dye bath was added water (liquid temperature: 30° C.) so that the bath ratio became 1:20 finally. Therein was immersed 1 kg of a bleached cotton knit, and thereto was added a 3% o.w.f. mixture of a cationic surfactant (a polyoxyethylenealkylamine surfactant) and a nonionic surfactant (a polyoxyethylene fatty acid ester surfactant) (mixing ratio of 100/40 (by weight of available ingredient)) with stirring to prepare a dye bath. The bath was heated to 70° C. over 10 minutes, and maintained at 70° C. for 10 minutes. Subsequently, to the heated bath were added 4% o.w.f. microcapsules including a thermochromic material (of which color is blue at a temperature of not higher than 35° C. and changes from blue to colorless at 35° C.), which microcapsules are made of a melamine resin as shell material and has a mean particle diameter of 3μ (trade name: DaithermoDR-35 violetC(TM)S, commercially available from DAINICHISEIKA COLOR & CHEMICALS MFG. CO., LTD.). The bath became cloudy at this time. Ten minutes later, acetic acid as an acid was added thereto in an amount of 1 g/l (pH: about 4). Then, the bath became semitransparent. Further 10 minutes later, to the bath was added a 2.4% o.w.f. amino-modified polyorganosiloxane (trade name: SCW, commercially available from OG Kabushiki Kaisha) as an agent for imparting exhaustion property and the bath became completely transparent. Ten minutes later, the knit was washed by water, dehydrated and dried (at 80° C. for 40 minutes) to give a thermosensitive fibrous structure according to the present invention.

EXAMPLE 2

The procedure of Example 1 was repeated except that a 0.5% o.w.f. benzotriazole ultraviolet absorbent (trade name: UVP, commercially available from OG Kabushiki Kaisha) was added to the bath just before washing by water, and 10 minutes later thereto was added a 4 g/l urethane resin as an agent for improving color fastness to washing (trade name: UK-100, commercially available from OG Kabushiki Kaisha) to give a thermosensitive fibrous structure according to the present invention.

EXAMPLE 3

The procedure of Example 1 was repeated except that after dehydrating, the knit was treated with an urethane resin (trade name: UK-100, commercially available from OG Kabushiki Kaisha) in an amount of 4 g/l in an another bath (30° C.) for 10 minutes to provide the urethane resin for the knit followed by drying, to give a thermosensitive fibrous structure according to the present invention.

EXAMPLES 4–5

As shown in Table 1, the procedure of Example 1 or 2 was repeated except that the order of addition of the materials was changed, the mixture of the surfactants (the same as that in Example 1) was added in an amount of 2.1% o.w.f., the microcapsules made of a urea resin as shell material (trade name: DaithermoDR-35 violet(S)S, commercially available from DAINICHISEIKA COLOR & CHEMICALS MFG. CO., LTD.) was used and the bath temperature was 60° C., to give a thermosensitive fibrous structure according to the present invention.

EXAMPLE 6

The procedure of Example 4 was repeated except that after dehydrating the knit was treated with an urethane resin (trade name: UK-100, commercially available from OG Kabushiki Kaisha) in an amount of 4 g/l in an another bath (30° C.) for 10 minutes to provide the urethane resin for the knit followed by drying, to give a thermosensitive fibrous structure according to the present invention.

EXAMPLE 7

To a dye bath was added water (liquid temperature: 30° C.) so that the bath ratio became 1:20 finally. Further, thereto were added the microcapsules used in Example 1 in an amount of 10% o.w.f., the mixture of the cationic surfactant and the nonionic surfactant used in Example 1 in an amount of 8% o.w.f. and acetic acid in an amount of 1 g/l and the mixture was stirred to prepare a dye bath. Then, bath became cloudy at this time. Subsequently, 1 kg of a bleached cotton knit was immersed in the bath. Then, the bath was heated to 60° C. over 10 minutes. Then, the bath became semitransparent. Further, after maintaining the bath at 60° C. for 10 minutes, to the bath was added the agent for imparting exhaustion property used in Example 1 in an amount of 6% o.w.f. and the bath became transparent. Ten minutes later, the knit was washed by water, dehydrated and dried (at 80° C. for 40 minutes) to give a thermosensitive fibrous structure according to the present invention.

EXAMPLE 8

The procedure of Example 7 was repeated except that just before washing by water, to the bath was added the ultraviolet absorbent used in Example 2 in an amount of 0.5% o.w.f., and 10 minutes later was added the agent for improving color fastness to washing used in Example 2 in an amount of 4 g/l to give a thermosensitive fibrous structure according to the present invention.

EXAMPLE 9

The procedure of Example 7 was repeated except that after dehydrating, to the bath was added the ultraviolet absorbent used in Example 2 in an amount of 0.5% o.w.f., and 10 minutes later was added the agent for improving color fastness to washing used in Example 2 in an amount of 4 g/l to give a thermosensitive fibrous structure according to the present invention.

COMPARATIVE EXAMPLES 1–3

As shown in Table 2, the procedure of Example 1 was repeated except that the surfactant, the acid or the agent for imparting exhaustion property was not used to give a fibrous structure.

COMPARATIVE EXAMPLES 4–6

As shown in Table 2, the procedure of Example 4 was repeated except that the surfactant, the acid or the agent for imparting exhaustion property was not used to give a fibrous structure.

COMPARATIVE EXAMPLES 7–8

As shown in Table 2, the procedure of Example 1 was repeated except that the order of addition of the materials was changed to give a fibrous structure.

COMPARATIVE EXAMPLE 9

The procedure of Example 1 was repeated except that the bath temperature was changed to 100° C. to give a fibrous structure.

COMPARATIVE EXAMPLES 10–12

As shown in Table 2, the procedure of Example 7 was repeated except that the surfactant, the acid or the agent for imparting exhaustion property was not used to give a fibrous structure.

The fibrous structures obtained according to the above mentioned processes were evaluated by the following methods. The results are shown in Tables 1 and 2.

Exhaustion property

Ten minutes after the addition of the agent for imparting exhaustion property (in Examples) or the final treating agent (in Comparative Examples), state of cloudiness in the bath was observed with eye and evaluated on four grades. In Tables, the grades "A", "B", "C" and "D" indicate completely transparent, almost transparent, considerably cloudy and extremely cloudy, respectively.

Fixing property

The color of the obtained fibrous structure is blue at a temperature around room temperature. Therefore, degree of the uniformity in blue coloring was observed with eye at room temperature and evaluated on four grades. In Tables, the grades "A", "B", "C" and "D" indicate uniform coloring (i.e., uniform fixing of the microcapsules), almost uniform coloring, some nonuniform coloring and extremely nonuniform coloring, respectively.

Coloring and fading property

The obtained fibrous structure is made colorless when touched by finger, and again blue-colored when cooled to room temperature (not more than 35° C.). Therefore, clearness of the color change was observed with eye and evaluated on four grades. In Tables, the grades "A", "B", "C" and "D" indicate extremely clear, almost clear, some unclear and extremely unclear, respectively.

Color fastness to washing

With respect to the fibrous structure obtained in each Example or each Comparative Example, color fastness to washing was evaluated according to A-2 method in JIS L0844-1973. In the evaluation, a detergent of the market (trade name: New beads, commercially available from KAO CORP) was used in an amount of 1 g/l instead of soap. The white cloth for examining of falling was not used. Then, degree of blue-coloring uniformity in the fibrous structure after washing with the detergent was observed with eye and evaluated on five grades. In Tables, the grade "5" indicates uniform coloring, i.e., no falling of the microcapsules. The smaller number of the grade means the higher degree of the falling. The grade "1" indicates complete falling.

Color fastness to light

With respect to the fibrous structure obtained in each Example or each Comparative Example, color fastness to light was evaluated according to JIS L0842-1971. The used irradiation time was 5 hours. Degree of coloring uniformity in the fibrous structure after irradiation was observed with eye and evaluated on five grades. In Tables, the grade "5" indicates uniform coloring. The smaller number of the grade means the more fading. The grade "1" indicates complete fading.

TABLE 1

| | Example No. | | | | | |
|---|---|---|---|---|---|---|
| | 1 | 2 | 3 | 4 | 5 | 6 |
| Treating agent | | | | | | |
| ① Mixture of surfactants (% o.w.f.) | 3 | 3 | 3 | 2.1 | 2.1 | 2.1 |
| ② Microcapsules (% o.w.f.) | 4 | 4 | 4 | 4 | 4 | 4 |
| ③ Acid (g/L) | 1 | 1 | 1 | 1 | 1 | 1 |
| ④ Agent for imparting exhaustion property (% o.w.f.) | 2.4 | 2.4 | 2.4 | 2.4 | 2.4 | 2.4 |
| ⑤ Ultraviolet absorbent (% o.w.f.) | — | 0.5 | 0.5 | — | 0.5 | 0.5 |
| ⑥ Urethane resin (g/L) | — | 4 | 4 | — | 4 | 4 |
| Order of addition* | ①→②→③→④ | ①→②→③→④→⑤→⑥ | ①→②→③→④→⑤→⑥ | ②→③→①→④ | ②→③→①→④→⑤→⑥ | ②→③→①→④→⑤→⑥ |
| pH of bath | 4.0 | 4.0 | 4.0 | 4.0 | 4.0 | 4.0 |
| State of bath | cloudy→ semi-transparent→ transparent | cloudy→ semi-transparent→ transparent | cloudy→ semi-transparent→ transparent | cloudy→ semi-transparent→ transparent | cloudy→ semi-transparent→ transparent | cloudy→ semi-transparent→ transparent |
| Bath temperature (°C.) | 70 | 70 | 70 | 60 | 60 | 60 |
| Evaluation results | | | | | | |
| Exhaustion property | A | A | A | A | A | A |
| Fixing property | A | A | A | A | A | A |
| Coloring and fading property | A | A | A | A | A | A |
| Color fastness to light (grade) | 1 | 5 | 5 | 1 | 5 | 5 |
| Color fastness to washing (grade) | 1 | 5 | 5 | 1 | 5 | 5 |

| | Example No. | | |
|---|---|---|---|
| | 7 | 8 | 9 |
| Treating agent | | | |
| ① Mixture of surfactants (% o.w.f.) | 8 | 8 | 8 |
| ② Microcapsules (% o.w.f.) | 10 | 10 | 10 |
| ③ Acid (g/L) | 1 | 1 | 1 |
| ④ Agent for imparting exhaustion property (% o.w.f.) | 6 | 6 | 6 |
| ⑤ Ultraviolet absorbent (% o.w.f.) | — | 0.5 | 0.5 |
| ⑥ Urethane resin (g/L) | — | 4 | 4 |
| Order of addition* | ①, ②, ③→④ | ①, ②, ③→④→⑤→⑥ | ①, ②, ③→④/⑤→⑥ |
| pH of bath | 4.0 | 4.0 | 4.0 |
| State of bath | cloudy→ semi-transparent→ transparent | cloudy→ semi-transparent→ transparent | cloudy→ semi-transparent→ transparent |
| Bath temperature (°C.) | 60 | 60 | 60 |
| Evaluation results | | | |
| Exhaustion property | A | A | A |
| Fixing property | A | A | A |
| Coloring and fading property | A | A | A |
| Color fastness to light (grade) | 1 | 5 | 5 |
| Color fastness to | 1 | 5 | 5 |

TABLE 1-continued washing (grade)

*The symbol "," in the column for Order of addition indicates that the agents punctuated thereby were mixed, and the symbol "/" in the column for Order of addition indicates that the treatment following after the symbol was carried out in an another bath.

TABLE 2

| | Example No. | | | | | |
|---|---|---|---|---|---|---|
| | 1 | 2 | 3 | 4 | 5 | 6 |
| Treating agent | | | | | | |
| ① Mixture of surfactants (% o.w.f.) | — | 3 | 3 | — | 2.1 | 2.1 |
| ② Microcapsules (% o.w.f.) | 4 | 4 | 4 | 4 | 4 | 4 |
| ③ Acid (g/L) | 1 | — | 1 | 1 | — | 1 |
| ④ Agent for imparting exhaustion property (% o.w.f.) | 2.4 | 2.4 | — | 2.4 | 2.4 | — |
| ⑤ Ultraviolet absorbent (% o.w.f.) | — | — | — | — | — | — |
| ⑥ Urethane resin (g/L) | — | — | — | — | — | — |
| Order of addition* | ②→③→④ | ①→②→④ | ①→②→③ | ②→③→④ | ②→①→④ | ②→③→① |
| pH of bath | 4.0 | 7.2 | 4.0 | 4.0 | 7.2 | 4.0 |
| State of bath | cloudy→ semi-transparent→ transparent (a little precipitation) | cloudy→ semi-transparent→ transparent (some precipitation) | cloudy→ semi-transparent (no precipitation) | cloudy→ semi-transparent→ transparent (a little precipitation) | cloudy→ semi-transparent→ transparent (some precipitation) | cloudy→ semi-transparent (no precipitation) |
| Bath temperature (°C.) | 70 | 70 | 70 | 60 | 60 | 60 |
| Evaluation results | | | | | | |
| Exhaustion property | B | B | C | B | B | C |
| Fixing property | D | D | B | D | D | B |
| Coloring and fading property | D | D | B | D | D | B |
| Color fastness to light (grade) | 1 | 1 | 1 | 1 | 1 | 1 |
| Color fastness to washing (grade) | 1 | 1 | 1 | 1 | 1 | 1 |

| | Example No. | | | | | |
|---|---|---|---|---|---|---|
| | 7 | 8 | 9 | 10 | 11 | 12 |
| Treating agent | | | | | | |
| ① Mixture of surfactants (% o.w.f.) | 3 | 3 | 3 | — | 8 | 8 |
| ② Microcapsules (% o.w.f.) | 4 | 4 | 4 | 10 | 10 | 10 |
| ③ Acid (g/L) | 1 | 1 | 1 | 1 | — | 1 |
| ④ Agent for imparting exhaustion property (% o.w.f.) | 2.4 | 2.4 | 2.4 | 6 | 6 | — |
| ⑤ Ultraviolet absorbent (% o.w.f.) | — | — | — | — | — | — |
| ⑥ Urethane resin (g/L) | — | — | — | — | — | — |
| Order of addition* | ④→②→③→① | ④→②→①→③ | ①→②→③→④ | ②, ③→④ | ①, ②→④ | ①, ②, ③ |
| pH of bath | 4.0 | 4.0 | 4.0 | 4.0 | 7.2 | 4.0 |
| State of bath | marked precipitation | marked precipitation | cloudy→ semi-transparent (no precipitation) | cloudy→ semi-transparent→ transparent (a little precipitation) | cloudy→ semi-transparent→ transparent (some precipitation) | cloudy→ semi-transparent (no precipitation) |
| Bath temperature (°C.) | 70 | 70 | 100 | 60 | 60 | 60 |
| Evaluation results | | | | | | |
| Exhaustion property | D | D | A | B | B | C |
| Fixing property | D | D | B | D | D | B |
| Coloring and fading property | D | D | B | D | D | B |
| Color fastness to light (grade) | 1 | 1 | 1 | 1 | 1 | 1 |
| Color fastness to washing (grade) | 1 | 1 | 1 | 1 | 1 | 1 |

*The symbol "," in the column for Order of addition indicates that the agents punctuated thereby were mixed, and the symbol "/" in the column for Order of addition indicates that the treatment following after the symbol was carried out in an another bath.

As is clear from the evaluation results in Tables 1 and 2, according to the present invention, a thermosensitive fibrous structure having excellent exhaustion property, fixing property, and coloring and fading property can be obtained. By further treating the thermosensitive fibrous structure according to the present invention, color fastness to washing and color fastness to light can be also improved therein.

In addition to the ingredients used in the Examples, other ingredients can be used in the Examples as set forth in the specification to obtain substantially the same results.

What we claim is:

1. A process for preparing a colored thermosensitive fibrous structure which comprises: adding a fibrous substrate mainly composed of cellulosic fiber, microcapsules containing a thermochromic material, a cationic surfactant and a nonionic surfactant to a dye bath maintained at a temperature of not higher than 90° C. and then adding an amino-modified polyorganosiloxane exhaustion agent to said bath at a pH not more than 7, thereby causing said fibrous substrate to exhaust said microcapsules from said bath, and obtaining said colored thermosensitive fibrous structure.

2. The process of claim 1, which comprises heating said bath to which water, said fibrous substrate and said cationic and nonionic surfactants have been added, to a temperature of 50° to 80° C., adding said microcapsules thereto, adjusting the pH of said bath to not more than 7, and adding thereto said exhaustion agent.

3. The process of claim 1, further comprising applying an urethane resin or a derivative thereof to said fibrous substrate after said microcapsules have been exhausted.

4. The process of claim 1, further comprising applying an ultraviolet adsorbent to said fibrous substrate after said microcapsules have been exhausted.

* * * * *

UNITED STATES PATENT AND TRADEMARK OFFICE
CERTIFICATE OF CORRECTION

PATENT NO.  :  5,298,035
DATED       :  March 29, 1994
INVENTOR    :  Masao OKAMOTO It is certified that error appears in the above-identified patent and that said Letters Patent is hereby corrected as shown below:

Col. 3, line 41, change "from 50° to because" to --from 50° to 80°C, because--.

Signed and Sealed this

Twentieth Day of September, 1994

Attest:

BRUCE LEHMAN

Attesting Officer        Commissioner of Patents and Trademarks